United States Patent
Eto et al.

(10) Patent No.: US 7,745,065 B2
(45) Date of Patent: Jun. 29, 2010

(54) VOLUME HOLOGRAM TRANSFER FOIL, AND VOLUME HOLOGRAM MULTILAYER STRUCTURE

(75) Inventors: Koji Eto, Tokyo (JP); Minoru Azakami, Tokyo (JP)

(73) Assignee: DAI Nippon Printing Co., Ltd., Tokyo (JP)

( * ) Notice: Subject to any disclaimer, the term of this patent is extended or adjusted under 35 U.S.C. 154(b) by 881 days.

(21) Appl. No.: 11/445,252

(22) Filed: Jun. 2, 2006

(65) Prior Publication Data

US 2006/0275671 A1    Dec. 7, 2006

(30) Foreign Application Priority Data

Jun. 2, 2005    (JP) ............................. 2005-162929
Jun. 2, 2005    (JP) ............................. 2005-162930

(51) Int. Cl.
*G03H 1/02*    (2006.01)
(52) U.S. Cl. .................... 430/1; 430/2; 359/3; 156/327
(58) Field of Classification Search ...................... None
See application file for complete search history.

(56) References Cited

U.S. PATENT DOCUMENTS

| | | | | |
|---|---|---|---|---|
| 5,095,375 | A * | 3/1992 | Bolt ................................ | 359/1 |
| 5,677,049 | A * | 10/1997 | Torii ........................ | 428/32.73 |
| 6,012,818 | A * | 1/2000 | Araki .......................... | 359/529 |
| 6,045,900 | A * | 4/2000 | Haffner et al. ............ | 428/315.9 |
| 2001/0046630 | A1 | 11/2001 | Toshine et al. .................. | 430/1 |
| 2003/0021025 | A1* | 1/2003 | Saiki et al. ................... | 359/490 |
| 2003/0134105 | A1* | 7/2003 | Toshine et al. .............. | 428/323 |
| 2004/0253521 | A1* | 12/2004 | Otaki et al. ...................... | 430/1 |
| 2005/0070433 | A1* | 3/2005 | Hirota .......................... | 503/227 |
| 2005/0191560 | A1* | 9/2005 | Otaki et al. ..................... | 430/1 |
| 2006/0019172 | A1* | 1/2006 | Ohtaki et al. ................... | 430/1 |

FOREIGN PATENT DOCUMENTS

| | | | |
|---|---|---|---|
| EP | 826512 | * | 3/1998 |
| EP | 1378370 | * | 1/2004 |

(Continued)

OTHER PUBLICATIONS

Skiest handbook of Adhesives, 3rd Ed. pp. 488-498 (1990).*

(Continued)

*Primary Examiner*—Martin J Angebranndt
(74) *Attorney, Agent, or Firm*—Sughrue Mion, PLLC

(57) ABSTRACT

The invention provides (1) a volume hologram transfer foil comprising a substrate and protective layer, a volume hologram layer and a heat seal layer stacked on the substrate in this order, wherein a multilayer structure comprising the protective layer, the volume hologram layer and the heat seal layer in this order is releasable from the substrate, and (2) a volume hologram transfer foil wherein the above protective layer is used as a heat seal layer. The heat seal layer comprises a polyester resin having a glass transition temperature of −10° C. to −30° C. With the invention, thermo-compression adhesion of the volume hologram layer to any application member, especially a polyester resin card is improved, so that the invention provides a volume hologram transfer foil useful for prevention of illegal copying, and a volume hologram multilayer structure formed using such a transfer foil.

18 Claims, 3 Drawing Sheets

FOREIGN PATENT DOCUMENTS

| | | | |
|---|---|---|---|
| JP | 63-132099 | * | 6/1988 |
| JP | 63-284586 A | | 11/1988 |
| JP | 04-185498 | * | 7/1992 |
| JP | 04-328186 | * | 11/1992 |
| JP | 2934281 B2 | | 5/1999 |
| JP | 2000-073038 | * | 3/2000 |
| JP | 2002-358018 A | | 12/2002 |
| JP | 2004-231915 | * | 8/2004 |
| JP | 2005-070064 | * | 3/2005 |
| JP | 2005-292818 | * | 10/2005 |
| WO | 2005/116756 | * | 12/2005 |

OTHER PUBLICATIONS

Dick Seal A-928 data sheet and English translation (3 pages).*

* cited by examiner

VOLUME HOLOGRAM TRANSFER FOIL, AND VOLUME HOLOGRAM MULTILAYER STRUCTURE

CROSS-REFERENCE TO RELATED APPLICATIONS

This application is based upon and claims the benefit of priority from prior Japanese Patent Application No. 2005-162929, filed on Jun. 2, 2005 and Japanese Patent Application No. 2005-162930, filed on Jun. 2, 2005, the entire contents of which are incorporated herein by reference.

BACKGROUND

1. Technical Field

The present invention relates to a hologram transfer foil that enables a volume hologram to be applied by thermo-compression onto any desired application member, and a volume hologram multilayer structure obtained by use of said transfer foil.

2. Related Art

A volume hologram provides a means capable of recording information in its thickness direction, and recording and reconstructing 3M images. Volume holograms are now fabricated by known fabrication processes. Typically, the volume holograms are used for prevention of illegal copying of ID cards, bank cards, etc., because they are fabricated by precise operations using the optical equipment and so are very difficult to fake. In addition, the volume holograms are expressed in interference colors of light and so have an outside appearance hardly achievable by other imaging means.

In a typical application taking full advantage of the aforesaid features of volume holograms, a hologram adhesive label, obtained in a film form with an adhesive attached thereto, is applied to a variety of associated members. For instance, JP-A-63-284586 discloses a transfer type hologram of a multilayer structure comprising a substrate, a volume hologram layer and a heat seal layer in this order. In view of illegal copying using a relief hologram, for instance, Japanese Patent No. 2,934,281 shows a transfer type hologram of a multilayer structure comprising a substrate, a relief hologram layer and a heat seal layer in this order.

In the former, however, the volume hologram layer is basically made up of a photocured resin layer whereas the associated member is formed of high-quality paper or the like. Such a material difference often makes it difficult to select a heat sealing agent showing satisfactory adhesion with respect to both materials, and so this label is applied to only a limited number of application members although depending on the heat sealing agent used. For this reason, the hologram layer peels off at an interface between the volume hologram layer and the heat seal layer or the heat seal layer and the application member, resulting in a high risk of illegal copying. A problem with the latter is that characters, images or the like on the application members cannot be seen through.

In view of prevention of illegal copying, the volume hologram layer must have good adhesion to the application member, and one approach to improvements in the adhesion between a volume hologram layer and an application member is typically set forth in JP-A-2002-358018 showing that the volume hologram layer and the application member are bonded together via a plurality of heat seal layers, and exemplifying a polyvinyl chloride or polyester resin sheet as the application member. However, the polyvinyl chloride sheet offers an environmental pollution problem arising from the generation of dioxin, etc. upon incineration and disposal. In recent years, therefore, the use of polyester resin sheets as application members has grown. Still, polyester resin sheets are lesser adhesive than polyvinyl chloride cards, and there is insufficient adhesion to the volume hologram layer, especially a volume hologram layer comprising a photocation type monomer and a photoradical type monomer, often offering a problem in conjunction with illegal copying. Multiple heat seal layers are unfavorable for fabrication, and so it is desired that the volume hologram layer and the application member be bonded together via a single-layer heat seal layer. What is especially in need is the development of a heat seal layer fit for the use of a polyester resin sheet as an application member.

The present invention has for its object the provision of a counterfeit resistant volume hologram transfer foil which enables a volume hologram layer to be well bonded by thermo-compression to any desired application member, especially a polyester resin card, and which, even when a volume hologram layer is formed of a volume hologram photosensitive material comprising a cation-polymerizable compound and a radical-polymerizable compound, is well bonded by thermo-compression to an application member as well as a volume hologram multilayer structure formed by use of such a transfer foil.

SUMMARY

The first hologram transfer foil of the invention comprises a substrate and a protective layer, a volume hologram layer and a heat seal layer stacked on the substrate in this order wherein a multilayer structure comprising the protective layer, the volume hologram and the heat seal layer in this order is releasable from said substrate, characterized in that the heat seal layer comprises a polyester resin having a glass transition temperature of $-10°$ C. to $-30°$ C.

The first hologram transfer foil of the invention is also characterized in that the polyester resin is a crystalline polyester resin having a melting point of $80°$ C. to $200°$ C., and the heat sea layer is formed using an aqueous dispersion of said resin.

Further, the first hologram transfer foil of the invention is characterized in that the polyester resin has a number-average molecular weight of 18,000 to 80,000.

Further, the first hologram transfer foil of the invention is characterized in that the heat seal layer contains a fine particle.

Further, the first hologram transfer foil of the invention is characterized in that there is a releasing film additionally provided on the heat seal layer.

Further, the first hologram transfer foil of the invention is characterized in that the volume hologram layer comprises a cation-polymerizable compound, a radical-polymerizable compound, a photoradical polymerization initiator system that is sensitive to specific wavelength light to polymerize the radical-polymerizable compound, and a photocation polymerization initiator system that is less sensitive to said specific wavelength light but is sensitive to another wavelength light to polymerize the cation-polymerizable compound.

Further, the first hologram transfer foil of the invention is characterized in that there is a primer layer interposed between the volume hologram layer and the heat seal layer.

The second hologram transfer foil of the invention comprises a substrate and a first heat seal layer, a volume hologram layer and a second heat seal layer stacked on said substrate in this order wherein a multilayer structure comprising the first heat seal layer, the volume hologram layer and the second heat seal layer in this order is releasable from said substrate, characterized in that the first and the second heat seal layer each comprises a polyester resin having a glass transition temperature of −10° C. to −30° C.

The second hologram transfer foil of the invention is also characterized in that the polyester resin is a crystalline polyester resin having a melting point of 80° C. to 200° C., and the first and the second heat seal layer are each formed using an aqueous dispersion of said resin.

Further, the second hologram transfer foil of the invention is characterized in that the polyester resin has a number-average molecular weight of 18,000 to 80,000.

Further, the second hologram transfer foil of the invention is characterized in that the first and the second heat seal layer each contain a fine particle.

Further, the second hologram transfer foil of the invention is characterized in that there is a release film additionally provided on the second heat seal layer.

Further, the second hologram transfer foil of the invention is characterized in that the volume hologram layer comprises a cation-polymerizable compound, a radical-polymerizable compound, a photoradical polymerization initiator system that is sensitive to specific wavelength light to polymerize the radical-polymerizable compound, and a photocation polymerization initiator system that is less sensitive to said specific wavelength light but is sensitive to another wavelength light to polymerize the cation-polymerizable compound.

Further, the second hologram transfer foil of the invention is characterized in that there is a primer layer interposed between the volume hologram layer and the first and/the second heat seal layer.

The first volume hologram multilayer structure of the invention comprises a heat seal layer, a volume hologram layer and a protective layer stacked on an application member in this order, characterized in that the heat seal layer comprises a polyester resin having a glass transition temperature of −10° C. to −30° C.

The first volume hologram multilayer structure of the invention is also characterized in that the application member is a polyester resin card or a polyester film.

Further, the first volume hologram multilayer structure of the invention is characterized in that there is a primer layer interposed between the volume hologram layer and the heat seal layer.

The second volume hologram multilayer structure of the invention comprises a first application member and a first heat seal layer, a volume hologram layer, a second heat seal layer and a second application member stacked on the first application member in this order, characterized in that the first and the second heat seal layer each comprise a polyester resin having a glass transition temperature of −10° C. to −30° C.

The second volume hologram multilayer structure of the invention is also characterized in that the first and the second application member are each a polyester resin card or a polyester film.

Further, the second volume hologram multilayer structure of the invention is characterized in that there is a primer layer interposed between the volume hologram layer and the first and/or the second heat seal layer.

BRIEF DESCRIPTION OF THE DRAWINGS

The invention will be described with reference to the accompanying drawings, wherein like numbers reference like elements.

DESCRIPTION OF EXEMPLARY EMBODIMENT

The invention provides a volume hologram transfer foil and a volume hologram multilayer structure, which enable the volume hologram layer, especially a volume hologram layer comprising a cation-polymerizable compound and a radical-polymerizable compound to be well bonded by thermo-compression to the application member, especially a polyester resin card. The volume hologram transfer foil is used to transfer the volume hologram layer onto the application member, thereby forming a volume hologram multilayer structure. When the volume hologram layer is forcedly peeled of the application member, there is a fracture of the material that forms the volume hologram layer or the application member, thereby ensuring prevention of illegal copying.

Figure 1:
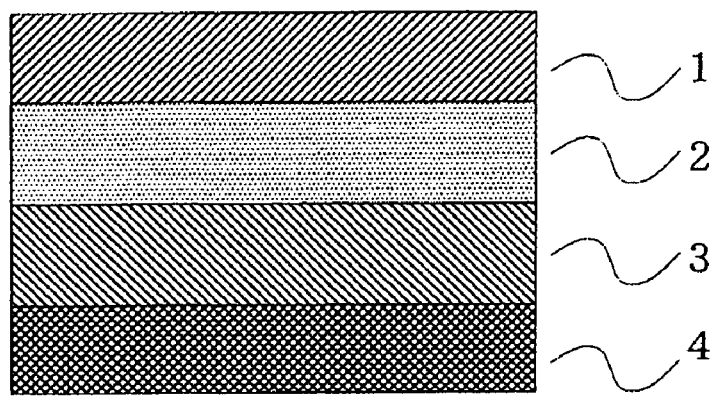
FIG. 1 is illustrative in section of one embodiment of the first volume hologram transfer foil according to the invention.
Figure 2:
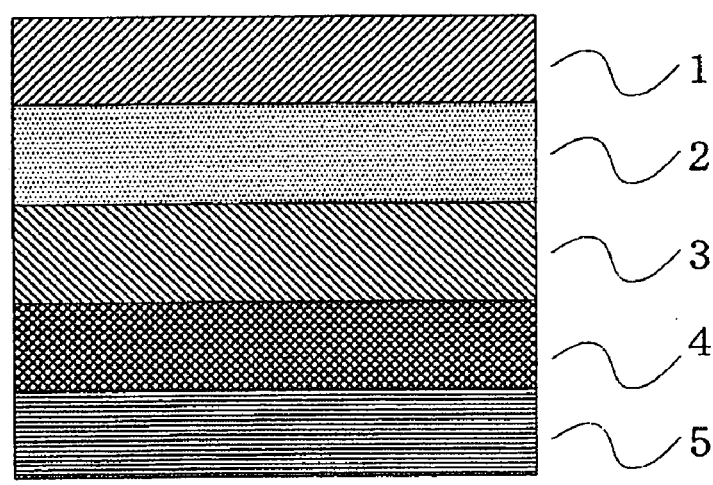
FIG. 2 is illustrative in section of one embodiment of the first volume hologram transfer foil according to the invention.
Figure 3:
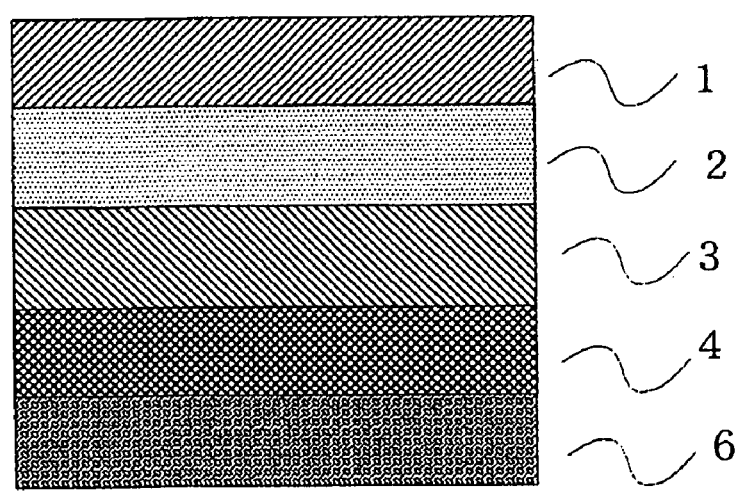
FIG. 3 is illustrative in section of the first volume hologram multilayer structure according to the invention.

FIG. 1 is illustrative in section of one embodiment of the first volume hologram transfer foil according to the invention, wherein reference numerals 1, 2, 3 and 4 are indicative of a substrate, a protective layer, a volume hologram layer and a heat seal layer, respectively. FIG. 2 is illustrative in section of another embodiment of the first hologram transfer foil according to the invention, wherein the same references as in FIG. 1 are indicative of the same components. FIG. 3 is illustrative in section of the first volume hologram multilayer structure obtained by use of the first hologram transfer foil of the invention, wherein reference numeral 6 is indicative of an application member and the same references as in FIG. 1 stand for the same components.

Figure 4:
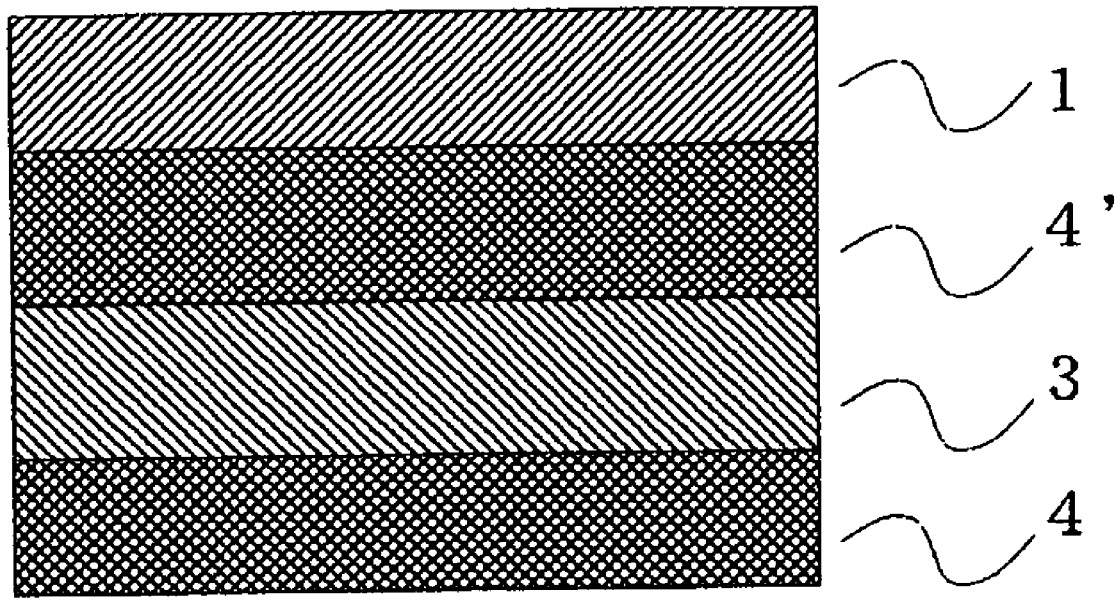
FIG. 4 is illustrative in section of one embodiment of the second volume hologram transfer foil according to the invention.
Figure 5:
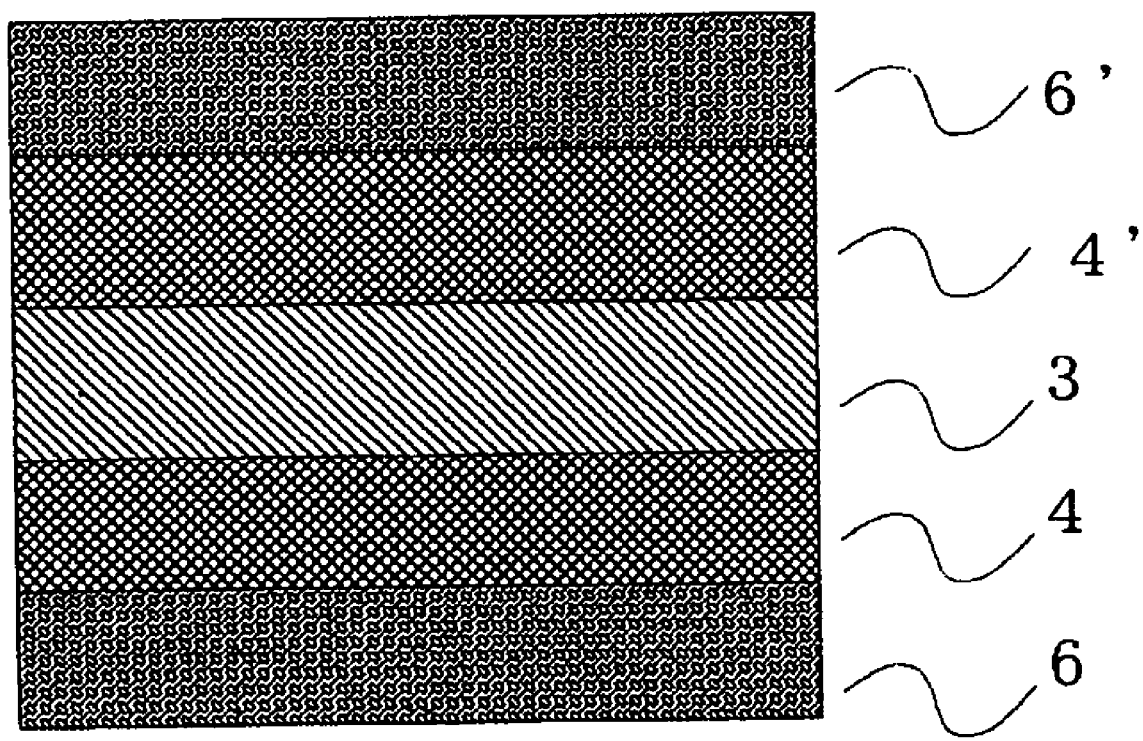
FIG. 5 is illustrative in section of the second volume hologram multilayer structure according to the invention.

FIG. 4 is illustrative of one embodiment of the second volume hologram transfer foil according to the invention, wherein 1, 4', 3 and 4 are indicative of a substrate, a first heat seal layer, a volume hologram layer and a second heat seal layer, respectively. FIG. 5 is illustrative in section of the second volume hologram stack obtained by use of the second hologram transfer foil according to the invention, wherein 6 and 6' are indicative of application members and the same numerals as in FIG. 4 are indicative of the same components.

Figure 6:
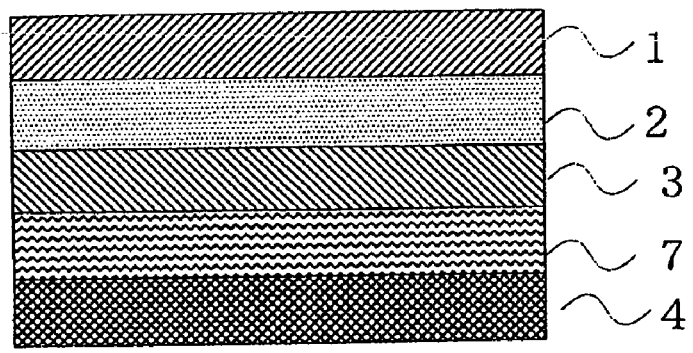
FIG. 6 is illustrative in section of one embodiment of the first volume hologram transfer foil according to the invention.
Figure 7:
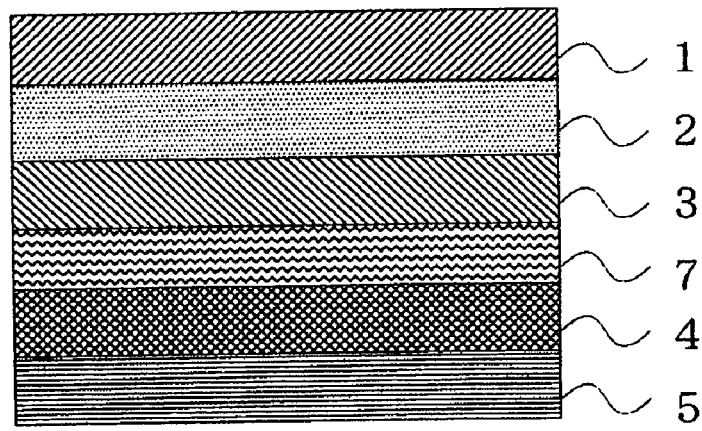
FIG. 7 is illustrative in section of one embodiment of the first volume hologram transfer foil according to the invention.
Figure 8:
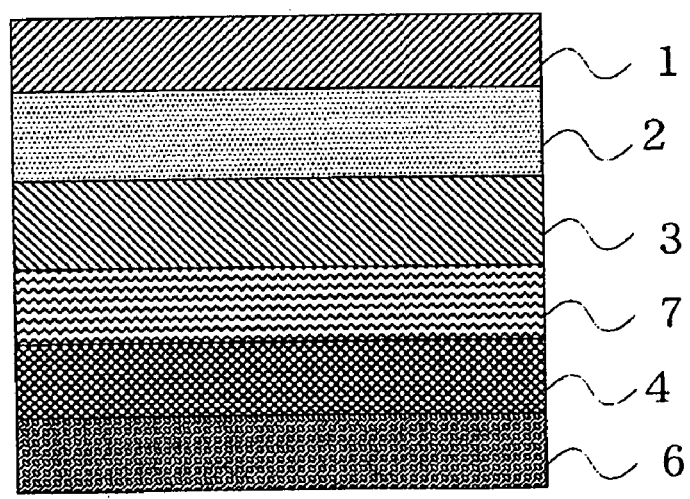
FIG. 8 is illustrative in section of the first volume hologram multilayer structure according to the invention.

FIG. 6 is illustrative in section of one embodiment of the first hologram transfer foil according to the invention, wherein 2, 3, 7 and 4 are indicative of a protective layer, a volume hologram layer, a primer layer and a heat seal layer, respectively. FIG. 7 is illustrative in section of another embodiment of the hologram transfer foil according to the invention, wherein 5 is indicative of a releasing film and the same references as in FIG. 6 are indicative of the same components. FIG. 8 is illustrative in section of one embodiment of a volume hologram stack obtained by use of the hologram transfer foil according to the invention, wherein 6 is indicative of an application member and the same references as in FIG. 6 are indicative of the same components.

In the volume hologram layer, interference light of object light and reference light is recorded in a photosensitive material much larger in thickness than the spacing between interference fringes; an object's three-dimensional structure is recorded in its entirety. The volume hologram layer 3 is formed by recording the interference fringes of object light and reference light directly in a volume hologram-forming material stacked on a support film or, alternatively, it is obtained by a copying process wherein an original volume hologram is in close contact with the volume hologram-forming material for exposure to light. Industrial fabrication relies upon the latter process. For the support film (not shown) on which the volume hologram-forming material is to be coated, use could typically be made of polyethylene terephthalate films (usually called PET film), polyethylene films, polypropylene films, polyvinyl chloride films, acrylic films, triacetyl cellulose films, and cellulose acetate butyrate films, each having a thickness of 1 μm to 1 mm, preferably 10 μm to 100 μm. For the support film, it is preferable to use a film of high transparency and high smoothness.

The volume hologram layer-forming photosensitive material used herein comprises a cation-polymerizable compound, a radical-polymerizable compound, a photoradical polymerization initiator system that is sensitive to specific wavelength light to polymerize the radical-polymerizable compound, and a photocation polymerization initiator system that is less sensitive to the above specific wavelength light but is sensitive to another wavelength light to polymerize the cation-polymerizable compound.

This photosensitive material is coated on the support film, then irradiated with laser light or the like to which the photoradical polymerization initiator system is sensitive, and finally irradiated with light having a different wavelength from that of the above laser light or the like, to which the photocation polymerization initiator system is sensitive, thereby recording a hologram therein. By irradiation with the laser light or the like (hereinafter called the first exposure), the radical-polymerizable compound is polymerized. Thereafter, the cation-polymerizable compound is subjected to overall exposure (hereinafter called the post-exposure), so that it is subjected to cation polymerization by Brønsted acid or Lewis acid generated by the decomposition of the photo-cation polymerization initiator system in the composition.

The cation-polymerizable compound used herein should be liquid at room temperature so that its polymerization can take place in a composition of relatively low viscosity all along. Such cation-polymerizable compounds, for instance, include diglycerol polyglycidyl ether, pentaerythritol polyglycidyl ether, 1,4-bis(2,3-epoxy-propoxyperfluoroisopropyl) cyclohexane, sorbitol polyglycidyl ether, trimethylolpropane polyglycidyl ether, resorcin diglycidyl ether, 1,6-hexanediol diglycidyl ether, polyethylene glycol diglycidyl ether and phenyl glycidyl ether.

The radical-polymerizable compound should preferably have at least one ethylenic unsaturated double bond in its molecule. The radical-polymerizable compound should have an average refractive index that is greater than that of the above cation-polymerizable compound preferably by at least 0.02; lower refractive indices are not preferable because modulation by refractive index becomes insufficient. The radical-polymerizable compound, for instance, includes acrylamide, methacrylamide, styrene, 2-bromostyrene, phenyl acrylate, 2-phenoxyethyl acrylate, 2,3-naphthalene dicarboxylic acid (acryloxyethyl) mono-ester, methylphenoxyethyl acrylate, nonylphenoxyethyl acrylate, and β-acryloxyethylhydrogen phthalate.

The photoradical polymerization initiator system may be such that active radicals are formed by the first exposure for hologram fabrication, acting to polymerize the radical-polymerizable compound. Alternatively, a sensitizer that is generally a light absorption component could be used in combination with an active radical generator compound or an acid generator compound. For the sensitizer in the photoradical polymerization initiator system, colored compounds such as dyes are often used to absorb visible laser light; however, cyanine dyes are preferable for colorless transparent holograms, because they are generally susceptible to decomposition by light. More specifically, when they are used in the invention, there is a colorless transparent hologram obtained, because the dye in the hologram is decomposed by the post-exposure herein or letting that hologram stand alone under room light or sunlight for a few hours to a few days, and so the hologram has no absorption in the visible range.

Exemplary cyanine dyes are anhydro-3,3'-dicarboxymethyl-9-ethyl-2,2'-thiacarbocyaninebetaine, anhydro-3-carboxymethyl-3',9-diethyl-2,2'-thiacarbocyaninebetaine, 3,3',9-triethyl-2,2'-thiacarbocyanine-iodine salt, and 3,9-diethyl-3'-carboxymethyl-2,2'-thiacarbocyanine iodine salt.

Exemplary active radical generator compounds that may be used in combination with the cyanine dyes are diaryl iodonium salts or 2,4,6-substituted-1,3,5-triazines. When high sensitivity is in need, the use of diaryl iodonium salts is particularly preferred. Exemplary diaryl iodonium salts include diphenyliodonium, 4,4'-dichlolodiphenyliodonium, and 4,4'-dimethoxydiphenyliodonium, and exemplary 2,4,6-substituted-1,3,5-triazines are 2-methyl-4,6-bis(trichloromethyl)-1,3,5-triazine, and 2,4,6-tris(trichloromethyl)-1,3,5-triazine.

For the photocation polymerization initiator system, it is preferable to use an initiator system such as one that is less sensitive to the first exposure light but is sensitive to the post-exposure light having a wavelength different from that of the first-exposure light to generate Brønsted acid or Lewis acid for the polymerization of the cation-polymerizable compound; however, particular preference is given to one that keeps the cation-polymerizable compound from polymerization during the first exposure. The photocation polymerization initiator system, for instance, includes diaryliodonium salts, triarylsulfonium salts or iron-allene complexes. Preferable diaryliodonium salts, for instance, include tetrafluoroborates, hexafluorophosphates, hexafluoroarsenates and hexafluoroantimonates of the iodonium salts mentioned in conjunction with the photoradical polymerization initiator system, and preferable triarylsulfonium salts, for instance, include triphenylsulfonium and 4-tertiary-butyltriphenylsulfonium.

For the photosensitive composition, it is preferable to contain inorganic fine particles or organic resin fine particles for the purpose of improving the peel-off capability of the volume hologram layer, because this makes it possible to intentionally induce defects in the volume hologram layer, which improve the peel-off capability of the volume hologram layer.

The organic resin fine particles typically include those of low-density polyethylene, high-density polyethylene, polypropylene, (meth)acrylic resin, polyvinyl chloride, polyamide, polyimide, polycarbonate, epoxy resin, urethane resin or their copolymers, and the inorganic fine particles typically include those of silica, mica, talc, clay, graphite, calcium carbonate, alumina, aluminum hydroxide, ferrite, china clay, kaolin, titanium dioxide, glass flake, asbestos, wax, fluorite, barium sulfate, scherben, chamotte and titania. These fine particles could be used alone or in admixture of two or more. Among others, fine particles of a fluororesin in which some or all of hydrogen atoms in the skeleton or side chains are substituted by fluorine atoms or titania fine particles are preferred. The reason why the fluororesin fine particles are preferred is that their low coefficient of friction makes interactions with other components contained in the volume hologram layer less likely to occur. For the fluororesin fine particles, the above exemplified organic fine particles could be used if treated on their surfaces with a fluorine compound. For instance, fine particles of (meth)acrylate resins treated with the fluorine compounds are preferably used. Besides, use could be made of fluorine-containing acrylates set forth in JP-A-5-194322, polymers using one or more fluorine monomers exemplified by fluorine-containing polyfunctional (meth)acrylic compounds of JP-A-2001-72648 or copolymers of these monomers with other compounds free of fluorine and having at least one ethylenic unsaturated bond per molecule, fluororesin composite fine particles set forth in JP-A-6-73137, fluorine-containing (meth)acrylate copolymers set forth in JP-A-5-194668, etc. which could be used alone or in admixture of two or more.

The inorganic or organic resin fine particles used herein should preferably have an average particle diameter of 100 nm to 600 nm, especially 150 nm to 500 nm, and more especially 200 nm to 500 nm, all less than the wavelength of laser light used for recording images in the volume hologram layer. Too large particle diameters are not preferable because of having possibly adverse influences on volume hologram recording. Fine particles' average particle diameter is measured by a laser method in which a dispersion having particles dispersed in a solvent is irradiated with laser light rays, and the ensuing scattered light is finely divided and computed to measure average particle diameters, particle size distributions, and so on. For instance, the average particle diameter is measurable with a particle size analyzer "Microtrack UPA Model-9230" made by L & N.

Preferably, the inorganic or organic resin fine particles are incorporated in an amount of 1% by mass to 30% by mass, especially 5% by mass to 20% by mass in the volume hologram layer. Too much renders it difficult for the volume hologram layer to retain strength and transparency.

If required, the photosensitive composition may contain a binder resin, a thermal polymerization preventive, a silane coupling agent, a plasticizer, a coloring agent and so on. The binder resin is used for the purpose of improving the film formation capability and film thickness consistency of the composition prior to hologram formation, and allowing interference fringe formed by polymerization by irradiation with light like laser light to be stably present until the post-exposure. The binder resin is preferably well compatible with the cation-polymerizable compound as well as the radical-polymerizable composition, and typically includes chlorinated polyethylene, polymethyl methacrylate, copolymers of methyl methacrylate with other alkyl (meth)acrylates, copolymers of vinyl chloride with acrylonitrile, and polyvinyl acetate. The binder resin could have cation-polymerizable or other reactive groups in its side or main chain.

The photosensitive composition may contain, per total weight, 2 to 70% by mass, preferably 10 to 50% by mass of the cation-polymerizable compound, 30 to 90% by mass, preferably 40 to 70% by mass of the radical-polymerizable compound, 0.3 to 8% by mass, preferably 1 to 5% by mass of the photoradical polymerization initiator system, and 0.3 to 8% by mass, preferably 1 to 5% by mass of the photocation polymerization initiator system.

The photosensitive composition is prepared by blending together the essential components and optional components with or without a solvent added to them if required, such as a ketone solvent like methyl ethyl ketone, an ester solvent like ethyl acetate, an aromatic solvent like toluene or xylene, a cellosolve solvent like methyl cellosolve, an alcoholic solvent like methanol, an ether solvent like tetrahydrofuran or dioxane, or a halogen solvent like dichloromethane or chloroform, and mixing the resulting blend at cool dark places, for instance, using a high-speed agitator.

The recording layer composed of the photosensitive composition is provided in the form of a coating solution containing this photosensitive composition in an amount of 15 to 50% by mass on a solid matter basis. If the support film is a single sheet form, then the coating solution is coated on it by means of bar coating, spin coating or dipping, and if the support film is in a rolled continuous form, then the coating solution is coated on it by means of gravure coating, roll coating, die coating or comma coating. The volume hologram-forming layer is solidified by drying or curing means matching with the coating solution. The thus obtained volume hologram-forming material layer is regulated to a dry thickness of 1 μm to 50 μm, preferably 5 μm to 20 μm, and is provided with a protective film, if necessary.

Recording the volume hologram in the volume hologram-forming material layer is carried out by using light like laser light (of, e.g., 300 to 1,200 nm in wavelength) in combination with an ordinary holographic aligner to polymerize the radical-polymerizable compound thereby recording interference fringes inside. At this stage, diffracted light occurs from the recorded interference fringes to yield a hologram. To further the polymerization of a portion of the cation-polymerizable compound remaining unreacted here, it is preferable that light (of, e.g., 200 to 700 nm in wavelength), to which the photocation polymerization initiator system is sensitive, is directed to all over the surface of the volume hologram-forming material layer by the post-exposure to complete the hologram. Note here that if, prior to the post-exposure, the recording layer is treated by heat or infrared radiation, then-diffraction efficiency, the peak wavelength and half width of diffracted light, etc. may be modified. The volume hologram transfer foil of the invention is much more improved in heat resistance than a photosensitive material using only a photoradical-polymerizable monomer as the polymerizable monomer (for instance, see JP-A-2002-358018), so that there is little influence of transfer by thermo-compression on hologram recording.

The volume hologram layer according to the invention has preferably a glass transition temperature of at least 50° C. in a state where it has a hologram recorded inside and treated by irradiation with ultraviolet radiation and heating, although there is no particular upper limit to it. As a result, there is no adverse influence on the recorded hologram upon transfer.

In the above state, the volume hologram layer according to the invention has a breaking strength of 0.01 to 5 kgf/mm$^2$, preferably 0.03 to 3 kgf/mm$^2$, and a breaking elongation of 0.01 to 30%, preferably 0.1 to 10%; that is, the volume hologram layer is fragile enough to break down upon forced peeling.

The glass transition temperature of the volume hologram layer is determined under the following measuring conditions.

Measuring Device: Solid Viscoelasticity Analyzer RSA-II (made by Rheometrics),

Measuring Mode: Film Tensile Mode, and

Measuring Frequency: 6.28 rad/s.

(1) A sample is set on a film tensile testing jig.

(2) The temperature dependency of the sample at the frequency of 6.28 rad/s is measured in any temperature region to determine the peak temperature of tan δ as a glass transition temperature.

The breaking strength and the breaking elongation of the volume hologram layer are measured with "INSTRON5565" General Purpose Materials Testing Machine according to JIS K7127-1989 under the following conditions.
Measuring Atmosphere: 25° C. and RH50%,
Testing Piece: 25 mm width, and
Tensile Speed: 2 mm/min.

The protective layer 2 provided over one surface of the volume hologram layer is now explained with reference to FIG. 1-3 and FIGS. 6-8. The protective layer is provided in such a way as to be releasable from between the substrate 1 and the volume hologram layer. The protective layer comprises a methacrylic resin like polymethyl methacrylate as a dominant binder and contains optional additives to impart hard coat capability, printability, slip properties, etc. to it. For the binder, other resins such as polyacrylate ester resins, polyvinyl chloride resins, cellulose resins, silicone resins, chlorinated rubber and caseins may also be used. For the additives, various surfactants, waxes and metal compounds may be used alone or in admixture of two or more. The additive or additives are regulated in terms of refractive index to provide an interface having a given refractive index difference for reflection of reconstruction wavelength light for the volume hologram. The releasable protective layer is preferably formed by formulating the above composition into an ink using an organic solvent and coating or otherwise providing the ink on the substrate 1, with a thickness of 0.1 μm to 3 μm in consideration of surface protection.

Alternatively, the releasable protective layer may be formed using an ionized radiation curing type resin that is broken down into an electron radiation curing type and an ultraviolet radiation curing type. The latter ultraviolet radiation curing type is the same in components as the former electron radiation curing type, with the exception of containing a photopolymerization initiator and a sensitizer. Generally, the ionized radiation curing type resin comprises a film formation component containing as its main component a monomer, an oligomer or a polymer having a radical-polymerizable active group in its structure. The monomer used here typically includes derivatives of (meth)acrylates, and the oligomer or polymer used here typically includes urethane acrylate and polyester acrylate. The ultraviolet radiation curing type resin composition is prepared by the addition to the above monomer or the like having a radical-polymerizable active group of acetophenones, benzophenone, Michler's benzoylbenzoate, α-aminoximester, tetramethylthiuram monosulfide and thioxanthones as a photopolymerization initiator and n-butylamine, triethylamine, tri-n-butylphosfine, etc. as a sensitizer. Curing here may be carried out by irradiation with 0.1 to 100 Mrad., preferably 1 to 10 Mrad. of 50 to 1,000 KeV, preferably 100 to 300 Kev electron radiation from a Cockcroft-Walton type electron radiation accelerator as an example, and 0.1 to 10,000 mJ/cm$^2$, preferably 10 to 1,000 mJ/cm$^2$ of ultraviolet radiation emitted out of a light source such as an ultra-high-pressure mercury lamp.

The substrate 1 is going to be released after transfer of the volume hologram transfer foil onto an application member. To this end, the substrate 1 may be treated with a releasing agent on its surface on the protective layer side or may make use of the releasability of the releasable protective layer. The substrate may be formed of polyethylene film, polypropylene film, polyethylene fluoride film, polyvinylidene fluoride film, polyvinyl chloride film, polyvinylidene chloride film, ethylene-vinyl alcohol film, polyvinyl alcohol film, polymethyl methacrylate film, polyether sulfone film, poletherether ketone film, polyamide film, tetrafluoroethylene-perfluoroalkylvinyl ether copolymer film, polyethylene terephthalate film, polyimide film, and so on, each having a thickness of 2 μm to 200 μm, preferably 10 μm to 50 μm. The substrate may be in either a transparent film form or an opaque film form kneaded and mixed with a shielding pigment such as carbon black, so that the hologram layer can be protected before use and there is no way one forgets to peel off the substrate.

The primer layer 7 stacked on another surface of the volume hologram layer is now explained. The primer layer 7 is provided for the heat-sensitive bonding of the volume hologram layer to the heat seal layer comprising a thermoplastic resin, as described later, and comprises a mixture of a water dispersion type polyurethane adhesive and a curing agent. Specifically, the primer layer is formed using the aqueous dispersion of said mixture, and provides a coated layer capable of being softened at low temperature with heat seal capability.

The water dispersion type polyurethane adhesive is typically exemplified by "Takelack W-2501" made by Mitsui Takeda Chemical, Inc., and "Evafanol HO-30C" made by Nicca Chemical Co., Ltd., and the curing agent here typically includes "Takenate WD-730" that is a water dispersion type polyisocyanate made by Mitsui Takeda Chemical, Inc., and "NK Assist IS-100N" made by Nicca Chemical Co., Ltd. "Takenate WD-730" is a commercial product wherein a nonionic hydrophilic group is given to a polyisocyanate compound. This is used in combination with the water dispersion type polyurethane adhesive to form a cross-linked structure that is well adhesive to the volume hologram layer.

The blending ratio by mass of the polyurethane adhesive and the curing agent is preferably such that the ratio of OH groups in the polyurethane resin and NCO groups in the polyisocyanate compound is (NCO/OH)=1.0 to 2.0. A mixture of polyurethane resin particles and the polyisocyanate compound is preferably provided in the form of a water dispersion, which is then coated and formed on the volume hologram layer in a dry thickness of 0.1 μm to 10 μm by means like a bar coater, an applicator or a gravure coater.

As the primer layer is formed from an aqueous solvent dispersion composed mainly of water, it makes it possible to prevent migration of monomer remnants in the volume hologram layer to the heat seal layer, thereby minimizing influences of that monomer on volume hologram recording. The primer layer, if formed of a resin of high crystallinity, can melt right away upon transfer by thermo-compression, thereby ensuring high transfer capability. Patent Publication 3 shows an organic solvent base polyurethane resin for adhesive purposes, but that is poor in adhesion to the volume hologram layer, as can be seen from Comparative Example 7 given later, offering a problem in conjunction with transfer capability.

The heat seal layer 4 in the first volume hologram transfer foil of the invention, and the first and second heat seal layers 4 and 4' in the second volume hologram transfer foil of the invention are now explained. The heat seal layer in a single layer form has a function of implementing heat-sensitive bonding of the volume hologram layer to an application member. Specifically, the single-layer heat seal layer formed of the same material bonds heat-sensitively to the volume hologram layer at one surface while it bonds heat-sensitively to the application member at another surface. The heat seal layer used herein is formed using a polyester resin having such a glass transition temperature as referred to later. Preferably, the heat seal layer is provided in the form of a dispersion in which the heat seal layer-forming material is dissolved or dispersed in water, a water/alcohol mixed solvent, or an organic solvent such as toluene or methyl ethyl ketone. Then, the dispersion is coated and formed on the volume hologram layer, a releasing film or a temporal support film in a dry thickness of 2 to 10 μm by means of a comma coater, a die coater, a gravure coater or the like. When the heat seal layer is formed on the temporal support film, it is preferable that after the heat seal layer is formed on the volume hologram layer by thermo-compression transfer, the temporal support film is removed off. Alternatively, the heat seal layer may be formed directly on the primer layer.

When the application member is a card or film formed of the polyester resin, it would have good adhesion capability because of being structurally similar to the heat seal agent. The polyester resin has preferably a glass transition temperature (Tg) of up to −10° C., especially −10° C. to −30° C. Too high a Tg is not preferable, because high temperature and high pressure are required for thermo-compression transfer to the application member, and there is discoloration of the hologram, etc. occurring in some cases.

For the polyester resin, an amorphous polyester resin having such a glass transition temperature as referred to above may be used as well. Besides, a crystalline polyester resin having not only the above glass transition temperature but also a melting point of 80° C. to 200° C., preferably 100° C. to 150° C. may be used. Upon thermo-compression transfer to the application member, the crystalline polyester resin can melt right away at a temperature higher than the melting point, bonding to the application member. When the crystalline polyester resin has too high a melting point, high temperature and high pressure are needed for thermo-compression transfer to the application member, and there is discoloration of the hologram, etc. occurring in some cases. Too low a melting point triggers tack development although depending on surrounding temperatures, and offers a blocking problem in volume hologram transfer foil fabrication processes.

The polyester resin has a number-average molecular weight (Mn) of 18,000 to 80,000, preferably 20,000 to 40,000. At a number-average molecular weight of less than 18,000, there are problems such as an adhesion capability drop. Exceeding 80,000 comes off an increase in ink viscosity, which may otherwise cause troubles in conjunction with coat capability.

The meting point and Tg of the crystalline polyester resin, and the Tg of the amorphous polyester resin, for instance, could be measured on a "automatic differential scan calorimeter DSC-60A" made by Shimadzu Seisakusho Co., Ltd., and the number-average molecular weight could be measured by means of a polystyrene-basis GPC (gel permeation chromatograph).

The polyester resin having such desired physical properties as referred to above could be obtained by an ordinary polycondensation of at least one of dicarboxylic acids or their anhydrides or alkyl esters and at least one of diols using an esterification catalyst or the like in an inert gas atmosphere. There are commercially available polyester resins such as a sheet-form product "Vylon 550 having a Tg of −15° C. and a number-average molecular weight of 48,284" made by Toyobo Ltd. and a similar product "Vylon BX1001 having a Tg of −18° C. and a number-average molecular weight of 28,678"; a solvent type product "Vylon UR8700 having a Tg of −22° C. and a number-average molecular weight of 29,208" made by Toyobo Ltd. and a similar product "Vylon UR3200 having a Tg of −3° C. and a number-average molecular weight of 32,660"; and an aqueous ink type product "Vylonal MD1985 having a melting point of 110° C., a Tg of −20° C. and a number-average molecular weight of 25,248" made by Toyobo Ltd. and a similar product "Vylonal MD1930 having a melting point of 130° C., a Tg of −10° C. and a number-average molecular weight of 18,826". The above "Vylonal" is composed of water dispersion type high-molecular-weight polyester resin particles having a hydrophilic functional group and water containing a small amount of an organic solvent and improved in terms of the water dispersibility of resin particles, has a crystal melting point, and is improved in terms of adhesion to PET.

The number-average molecular weights of the above commercially available polyester resins are measured as follows.

(1) Sheet-Form "Vylon 550" and "Vylon BX1001"

A sample was dissolved in THF into a solution at a concentration of 0.5 wt %. For GPC measurement, a liquid chromatogram (HLC-8020 made by Toso Co., Ltd.) was used. GPC was measured using THF as an eluate, a GPC column (TSKgelG20000H×L+G3000H×L+G5000H×L), a column temperature of 40° C., a flow rate of 1 ml/min., and RI (a differential refractive index detector) as a detector.

(2) Solvent Type "Vylon UR8700" and "Vylon BX1001"

A sample was dried in vacuum into a dry solid. The obtained dry solid was dissolved in NMP into a solution at a concentration of 0.5 wt %. For GPC measurement, a liquid chromatogram (HLC-8120GPC made by Toso Co., Ltd.) was used. The eluate used here was prepared by dissolving LiBr in NMP in such a way as to have a concentration of 1 mM. GPC was measured with two GPC columns (TSKgel α-M made by Toso Co., Ltd.) at a column temperature of 40° C. and a flow rate of 0.5 ml/min., using RI (a differential refractive index detector) as a detector.

(3) Aqueous Ink Type "Vylonal MD1985" and "Vylonal MD1930"

A sample was separated in an ultracentrifugal separator at 90,000 rpm for 5 hours into a supernatant liquid and sediment. The sediment was dissolved in NMP into a solution at a concentration of 0.5 wt %. For GPC measurement, a liquid chromatogram (HLC-8120GPC made by Toso Co., Ltd.) was used. The eluate used here was a buffer solution prepared by dissolving LiBr and phosphoric acid in NMP each at a concentration of 50 mM (for the purpose of preventing adsorption of matter of higher polarity onto the columns). GPC was measured with two GPC columns (TSKgel α-M made by Toso Co., Ltd.) at a column temperature of 40° C. and a flow rate of 0.5 ml/min., using RI (a differential refractive index detector) as a detector.

As the polyester resin used is of the "water dispersion type" wherein it is dispersed in an aqueous solvent composed primarily of water, it makes it possible to prevent migration of monomer remnants from the volume hologram layer into the heat seal layer and, hence, minimize adverse influences on volume hologram recording, On the other hand, the amorphous polyester resin is used while it is dissolved in an organic solvent.

The heat seal layer preferably contains inorganic fine particles or organic resin fine particles for the purpose of giving it peel-off capability and block resistance. The inorganic fine particles typically include silica fine particles, alumina fine particles and ZnO fine particles, although the silica fine particles {SiOx ($1.5 \leq x \leq 2.0$ with a refractive index of 1.35 to 1.48} are preferred. The fine particles have preferably a particle diameter of 0.1 μm to 10 μm. In other words, the particle diameter is preferably less than the thickness of the heat seal layer; a greater thickness than that is not preferred, because heat transferability decreases. The proportion by mass of the polyester resin and the fine particles is 75:1 to 75:12, preferably 75:3 to 75:5. Higher proportions of fine particles are not preferable, because even by heat transfer, there is a drop of adhesion to the application members. Note here that the average particle diameter is measured by a laser diffraction scattering method.

Usually, the heat seal layer is composed of the polyester resin alone or used in a colorless transparent layer form comprising a polyester resin/inorganic fine particle mixture. However, it is acceptable that the heat seal layer is provided in a multilayer form comprising, from the volume hologram layer side, the heat seal layer and a coloring agent layer colored by a solvent-soluble dye or a solvent dispersion pigment, or a light-reflecting metal thin-film layer and the heat seal layer. Provision of the coloring agent layer or the light-reflecting metal thin-film layer ensures images of improved contrast, because it provides a background color against the hologram image. For the coloring agent layer colored by the solvent-soluble dye, it is preferable that the water dispersion type crystalline polyester resin is used as the heat seal layer in contact with the volume hologram layer, thereby preventing migration of the coloring agent component from the coloring agent layer into the volume hologram layer and holding back adverse influences on volume hologram recording. There is another advantage of placing no limitation on the dyes used in the coloring agent layer.

The releasing film 5 in the volume hologram transfer foil is now explained. For that releasing film, not only commonly available releasing paper but also a polyethylene terephthalate resin film and a releasing film are used. The releasing film here has been treated with a fluorine or silicone releasing agent. Referring here to the second heat seal layer in the second volume hologram transfer foil depicted in FIG. 4, it is understood that a similar releasing film may be applied on it, although not depicted.

The counterfeit resistance of the hologram transfer foil of the invention is now explained. In the hologram transfer foil of the invention, the adhesion force between the volume hologram layer and the application member is greater than the material fracture force of the volume hologram layer, so that when the volume hologram is forcedly peeled off the application member for illegal copying purposes after transfer of the hologram to it, the material of the volume hologram layer breaks down, unable to reconstruct the hologram image. When a polyester resin card is used as the application member, the good adhesion between the volume hologram layer and the polyester resin card ensures a fracture of the volume hologram layer. It is noted that even when a photograph or top-quality paper with limited material fracture force is used as the application member, the material of the application member breaks down upon a forcible peel of the volume hologram layer off it, again ensuring prevention of illegal copying.

One embodiment of the process of fabricating the first hologram transfer foil according to the invention is now described. One exemplary fabrication process comprises the steps wherein:

(1) The volume hologram-forming layer is formed on a temporary carrier, and the protective film is stacked on the volume hologram layer. After that, a Lippmann hologram is recorded in the volume hologram layer.

(2) After the volume hologram is recorded, the stack is heated at 50 to 100° C. for 1 to 20 minutes to peel the protective film off it.

(3) A protective layer-forming layer is provided on a releasing film into a transfer member. After that, the transfer member is stacked at the protective layer-forming layer on the volume hologram layer obtained in (2). Optionally, the stack is rolled for thermo-compression at 50° C. to 100° C. using a heated roll to keep the hologram recorded in the volume hologram layer from being affected.

(4) The obtained stack is irradiated all over its entire surface with ultraviolet radiation from a high-pressure mercury lamp to fix the volume hologram in place.

(5) After removal of the temporary carrier off the stack, the heat seal layer is formed by coating on the surface of the volume hologram layer, if required, with a releasing film stacked on it. Alternatively, the heat seal layer is formed by coating on the releasing film, and then transferred by thermo-compression onto the surface of the volume hologram layer.

At (5), after removal of the temporary carrier off the stack, the primer layer and the heat seal layer may be sequentially formed by coating on the surface of the volume hologram layer. Alternatively, the heat seal layer and the primer layer may be formed by coating on the releasing film or the temporary support film in this order. Then, the stack is placed at the primer layer on the surface of the volume hologram layer for thermo-compression transfer of the primer layer and the heat seal layer, thereby forming the primer layer and the heat seal layer.

After removal of the releasing film, the obtained first hologram transfer foil is transferred by thermo-compression onto the application member (to be described later) at 60° C. to 200° C., preferably 100° C. to 160° C. and a pressure of 0.5 Mpa to 15 Mpa that differs with the type of the application member, if required, followed by removal of the substrate, so that the volume hologram layer can be transferred onto the application member.

One exemplary process of fabricating the second hologram transfer foil according to the invention comprises the steps wherein:

(1) The volume hologram-forming layer is formed on a temporary carrier, and the protective film is stacked on the volume hologram layer. After that, a Lippmann hologram is recorded in the volume hologram layer.

(2) After the volume hologram is recorded, the stack is heated at 50 to 100° C. for 1 to 20 minutes to peel the protective film off it.

(3) The first heat seal layer-forming layer is provided on a releasing film into a transfer member. After that, the transfer member is stacked at the first heat seal layer-forming layer on the volume hologram layer obtained in (2). Optionally, the stack is rolled for thermo-compression at 50° C. to 100° C. using a heated roll to keep the hologram recorded in the volume hologram layer from being affected.

(4) The obtained stack is irradiated all over its entire surface with ultraviolet radiation from a high-pressure mercury lamp to fix the volume hologram in place.

(5) After removal of the temporary carrier off the stack, the second heat seal layer is formed by coating on the surface of the volume hologram layer, if required, with a releasing film stacked on it. Alternatively, the second heat seal layer is formed by coating on the releasing film, and then transferred onto the surface of the volume hologram layer under heat and pressure.

At (3), it is acceptable that after the first heat seal layer-forming layer and the primer layer-forming layer are sequentially formed on the releasing film into a transfer member, the transfer member is stacked at the primer layer formation layer on the volume hologram layer, and the stack is then rolled for thermo-compression at 50° C. to 100° C. using a heated roll so as to keep the hologram recorded in the volume hologram layer from being affected.

At (5), after removal of the temporary carrier off the stack, the primer layer and the second heat seal layer may be sequentially formed by coating on the surface of the volume hologram layer, if required, followed by stacking of the releasing film. Alternatively, the second heat seal layer and the primer layer may be formed by coating on the releasing film in this order, and the stack is then placed at the primer layer on the surface of the volume hologram layer for thermo-compression transfer onto the primer layer and the second heat seal layer, so that the primer layer and the second heat seal layer can be formed.

The obtained second hologram transfer foil is transferred by thermo-compression onto the application member 6 (to be described later) at 60° C. to 200° C., preferably 100° C. to 160° C. and a pressure of 0.5 Mpa to 15 Mpa that differs with the type of the application member. After the thermo-compression transfer, the releasing film is peeled off, and the application member 6' (to be described later) is engaged by thermo-compression with the surface where the releasing film was under similar conditions, so that there can be the second volume hologram stack obtained wherein the volume hologram layer is held between the application members 6 and 6' via the first and second heat seal layers 2 and 4, respectively.

The second volume hologram multilayer structure of the invention is constructed such that application members such as films or cards are applied to both surface of the volume hologram layer; it is more improved than the protective layer formed by the coating of the first volume hologram layer in terms of protective functions such as scratch resistance as well as counterfeit resistance. In the second volume hologram multilayer structure, it is preferable that at least one of the application members 6 and 6' is transparent.

The application member 6 in the volume hologram multilayer structure typically includes transparent or opaque members such as glass and plastics. The plastic card here typically includes cards made up of vinyl chloride resin, acrylic resin, polystyrene resin, polyester resin like polyethylene terephthalate, and polycarbonate resin. Particular preference is given to cards, sheets, and films made up of polyester resin. Exemplary products or articles built up of these materials are windows, observation windows or doors of the means or facilities of transportation such as motorcars, railway trains, ships or airplanes as well as windows, doors, fixed sash windows and transoms of buildings. The hologram transfer foil of the present invention may also be applied to transparent glasses or transparent plastics sheets on the surfaces of the instruments and displays located around drivers' seats, control decks or like sites in such means of transportation.

The hologram transfer foil of the invention may be applied to the surfaces of displays of various devices such as electric appliances, clocks or watches and cameras, some being not always colorless and transparent, and some being black when put off. Such devices also include those having display functions, e.g., calculators, portable terminal equipment such as portable personal computers, cellular phones, IC recorders, CD players, DVD players, MD players, video tape recorders and audio equipment. The hologram transfer foil of the invention, when it can be seen through, may be applied such devices while the hologram image of the volume hologram layer 2 can be superposed thereon without detrimental to the display functions inherent therein. To add to this, the hologram transfer foil of the invention may be applied to upscale wristwatches, jewels, noble metals, antiques or their cases for the purposes of warranting that they are genuine, taking advantage of difficulty of fabrication of the volume hologram 2 in the hologram transfer foil. In this case, the hologram transfer foil may be applied to such articles irrespective of whether they are transparent or opaque.

The hologram transfer foil of the invention may be applied to sheets such as identification papers and certificates for examination, cards such as ID cards and booklets such as passports, or may be used as certificates indicating public security and health ranks for fire preventions, sterilization, etc. In principal, the hologram transfer foil of the invention may be used as equivalents to paper certifications sealed on articles that are transparent and in a substantially flat sheet or quadratic surface form. In addition, the hologram transfer foil of the invention may be applied to films or sheets made up of paper, synthetic paper, synthetic resins and metals as well as articles including glass or other parts. By taking advantage of volume hologram's unique properties of making it possible to reconstruct three-dimensional images, the hologram transfer foil of the invention may be used as labels affixed to books or saddle stitched magazines such as monthlies, automotive glass windows, premium commodity goods, etc.

The hologram image in the volume hologram layer 2 may be designed in conformity to what field and purpose it is used in and for, and may arbitrarily carry symbols and characters indicative of the necessary meanings. A hologram image itself may be obtained by recording actual objects in hologram photosensitive materials or by designing hologram diffraction gratings by calculation or processing digital images obtained using digital cameras or two- or three-dimensional images obtained from computer graphics by suitable means such as holographic stereography.

The hologram transfer foil of the invention may have been cut inconformity to the shape of an application article or part. When the hologram transfer foil of the invention includes the releasing film, it is preferable to make a notch in portions of the hologram transfer foil other than the releasing film. This is because individual labels of given shape can be taken out of the hologram transfer foil that is of large size or in a rolled-up form for application to articles. Such processing may be carried out by making a notch. To make a notch only in the portions of the hologram transfer foil other than the releasing film, it is preferable to vertically move a blade at a stroke corresponding to the thickness of the releasing film. It is also preferable to remove respective layers other than the releasing film between adjacent hologram transfer foils, leaving individual hologram transfer foils of given shape. In this case, the releasing film may be provided at its boundaries with perforations along which individual hologram transfer foils are detachable.

The invention is now explained with reference to examples. Note here that Examples 1-7 and 9-14, described below, give an account of the first volume hologram transfer foil, while Example 8 gives an account of the second volume hologram transfer foil.

Example 1

First Multilayer Structure Having a Volume Hologram-forming Material Layer

A volume hologram-forming material composed of 40 parts of the composition, mentioned just below, and 60 parts by mass of a mixed solvent consisting of methyl ethyl ketone/methanol=1/1 (by mass) was coated on a 50 µm-thick PET film (Lumilar T60 made by Toray Industries Inc.) at a dry thickness of 20 µm by means of gravure coating.

| | |
|---|---|
| Binder resin {methyl methacrylate/glycidyl methacrylate copolymer having a copolymerization ratio (by mass) of 90/10 and a weight-average molecular weight of 50,000}: | 30 parts by mass |
| Bis(4-acryloxydiethoxyphenyl)methane: | 30 parts by mass |
| 1,6-hexanediol diglycidyl ether: | 30 parts by mass |
| Photoradical polymerization initiator (also acting as photocation polymerization initiator) (diphenyliodonium hexafluoroantimonate) | 4 parts by mass |
| Sensitizer (3,9-diethyl-3'-carboxymethyl-2,2'-thiacarbocyanine iodine salt): | 1 part by mass |
| Fine particles (Fluon L170J made by Asahi Glass Co., Ltd. and having an average particle diameter of 200 nm): | 5 parts by mass |

Then, a 50 μm-thick, surface releasing PET film (SP-PET made by Tohcello Co., Ltd.) was laminated on the thus coated surface to obtain a first multilayer structure.

Second Multilayer Structure Having a Protective Layer

The following composition working as a protective layer was coated on a 50 μm-thick PET film (Lumilar T60 made by Toray Industries Inc.) by means of a gravure coater to obtain a multilayer structure having a protective layer having a dry thickness of 1 μm.

| | |
|---|---|
| Polymethyl methacrylate (having a molecular weight of 35,000) | 97 parts by mass |
| Polyethylene wax (having a molecular weight of 10,000) | 3 parts by mass |
| Solvent (methyl ethyl ketone/toluene = 1/1 by mass) | 400 parts by mass |

Volume Hologram Recording

With laser light of 532 nm in wavelength, a Lippmann hologram was taken and recorded in the above first multilayer structure. After recording, the multilayer structure was heated for 10 minutes in an atmosphere of 100° C., and the surface releasing PET film was peeled off to bare out the volume hologram layer.

The above second multilayer structure was placed on the protective layer side over the exposed surface of the volume hologram layer, and then passed between a pair of nipped, heated rollers of 80° C. into a multilayer structure of PET film/volume hologram layer/protective layer/PET film, which was then irradiated all over the surface with ultraviolet radiation at a dose of 2,500 mJ/cm$^2$, using a high-pressure mercury lamp to fix the volume hologram in place.

Coating of the Heat Seal Layer

Then, the PET film was peeled from the multilayer structure of PET film/volume hologram layer/protective layer/PET film to bare out the volume hologram layer, and the following composition was coated on the surface of that volume hologram layer at a post-drying thickness of 4 μm by means of gravure coating to obtain the inventive volume hologram transfer foil.

| | |
|---|---|
| Polyester resin (Vylon 550 made by Toyobo Ltd. and having a Tg of −15° C. and a number-average molecular weight of 48,284) | 30 parts by mass |
| Solvent (methyl ethyl ketone/toluene = 1/1 by mass) | 70 parts by mass |

Example 2

The inventive volume hologram transfer foil was obtained as in Example 1 with the exception that the material having the following composition was used for the coating of the heat seal layer.

| | |
|---|---|
| Polyester resin (Vylon BX1001 made by Toyobo Ltd. and having a Tg of −18° C. and a number-average molecular weight of 28,678) | 30 parts by mass |
| Solvent (methyl ethyl ketone/toluene = 1/1 by mass) | 70 parts by mass |

Example 3

The inventive volume hologram transfer foil was obtained as in Example 1 with the exception that the material having the following composition was used for the coating of the heat seal layer.

| | |
|---|---|
| Polyester resin (Vylon UR8700 made by Toyobo Ltd. and having a Tg of −22° C. and a number-average molecular weight of 29,208) | 30 parts by mass |
| Solvent (methyl ethyl ketone/toluene = 1/1 by mass) | 70 parts by mass |

Example 4

The inventive volume hologram transfer foil was obtained as in Example 1 with the exception that the material having the following composition was used for the coating of the heat seal layer.

| | |
|---|---|
| Polyester resin (Vylonal MD1985 made by Toyobo Ltd. and having a melting point of 110° C. and a number-average molecular weight of 25,248) | 50 parts by mass |
| Solvent (water/isopropyl alcohol = 1/1 by mass) | 50 parts by mass |

Example 5

The inventive volume hologram transfer foil was obtained as in Example 1 with the exception that the material having the following composition was used for the coating of the heat seal layer.

| | |
|---|---|
| Polyester resin (Vylonal MD1930 made by Toyobo Ltd. and having a melting point of 110° C. and a number-average molecular weight of 18,826) | 50 parts by mass |
| Solvent (water/isopropyl alcohol = 1/1 by mass) | 50 parts by mass |

Example 6

The inventive volume hologram transfer foil was obtained as in Example 1 with the exception that the material having the following composition was used for the coating of the heat seal layer.

| | |
|---|---|
| Polyester resin (Vylonal MD1985 made by Toyobo Ltd. and having a melting point of 110° C. and a number-average molecular weight of 25,248) | 75 parts by mass |
| Silica fine particles (Silysia A420 made by Fuji Silisia Chemical Ltd. and having a particle diameter of 4.1 μm) | 12 parts by mass |
| Solvent (water/isopropyl alcohol = 1/1 by mass) | 50 parts by mass |

Example 7

Third Multilayer Structure Comprising a Heat Seal Layer/Releasing Film

The following composition was coated on the releasing surface of a 50 μm-thick PET film (SP-PET made by Tohcello Co., Ltd.) at a post-drying thickness of 4 mm by means of gravure coating to obtain a third multilayer structure having a heat seal layer.

| | |
|---|---|
| Polyester resin (Vylon 550 made by Toyobo Ltd. and having a Tg of −15° C. and a number-average molecular weight of 48,284) | 30 parts by mass |
| Solvent (methyl ethyl ketone/toluene = 1/1 by mass) | 70 parts by mass |

Then, the PET film was peeled from the multilayer structure of "PET film/volume hologram layer/protective layer/PET film" with the volume hologram layer fixed, obtained in Example 1, to bare out the volume hologram layer. Finally, the third multilayer structure was placed on the heat seal layer side over the surface of that volume hologram layer, and passed between a pair of nipped, heated rollers of 120° C. to obtain the inventive volume hologram transfer foil having a multilayer construction of the releasing PET film/heat seal layer/volume hologram layer/protective layer/PET film.

Comparative Example 1

A comparative volume hologram transfer foil was obtained as in Example 1 with the exception that the material comprising the following composition was used for the coating of the heat seal layer.

| | |
|---|---|
| Polyester resin (Vylon UR3200 made by Toyobo Ltd. and having a Tg of −3° C. and a number-average molecular weight of 32,660) | 30 parts by mass |
| Solvent (methyl ethyl ketone/toluene = 1/1 by mass) | 70 parts by mass |

Comparative Example 2

A comparative volume hologram transfer foil was obtained as in Example 1 with the exception that the material comprising the following composition was used for the coating of the heat seal layer.

| | |
|---|---|
| Polyester resin (LP-050 made by Nippon Synthetic Chemical Industry Co., Ltd. and having a Tg of 10° C. and a number-average molecular weight of 16,000) | 30 parts by mass |
| Solvent (methyl ethyl ketone/toluene = 1/1 by mass) | 70 parts by mass |

Comparative Example 3

A comparative volume hologram transfer foil was obtained as in Example 1 with the exception that the material comprising the following composition was used for the coating of the heat seal layer.

| | |
|---|---|
| Ethylene-vinyl acetate copolymer resin (EC1700 made by Chuorika Co., Ltd.) | 60 parts by mass |
| Solvent (isopropyl alcohol) | 40 parts by mass |

The volume hologram transfer foils obtained in Examples 1-7 and Comparative Examples 1-3 were each thermally compressed under conditions of 140° C., 0.5 sec. and 0.7 Mpa onto application members: a polyvinyl chloride card, a polyester resin card (PET-G card) and coated paper (Swing Mat made by Mitsubishi Paper Mills Ltd., 64.0 g/m$^2$) for thermo-compression transfer of the volume hologram layer to the application member. Note here that the volume hologram transfer foil of Example 7 was thermally transferred onto the application member after the releasing film was peeled off it. Just after lamination (after about 2 seconds), the substrate was peeled off between the volume hologram layer and the protective layer to determine the transfer capability of the volume hologram layer. The samples were all found to have good transfer capability.

After the transfer, Cellotape® (made by Nichiban Co., Ltd.) was applied onto each protective layer from above, and stripped off by brutal force to measure adhesion to the application. In the volume hologram multilayer structures obtained using the volume hologram transfer foils of Examples 1-7, the volume hologram layers were found to remain unpeeled off all the application members. In the volume hologram multilayer structures obtained using the volume hologram transfer foils of Comparative Examples 1 and 2, however, each volume hologram layer was found to pass from the application member to the Cellotape® (made by Nichiban Co., Ltd.) side, indicating inferior adhesion. In the volume hologram multilayer structure obtained using the volume hologram transfer foil of Comparative Example 3, there was a peel between the volume hologram layer and the heat seal layer.

Example 8

Fourth Multilayer Structure Comprising the First Heat Seal Layer/Releasing Film The first heat seal-forming composition, mentioned below, was coated on the releasing surface of a 50 μm-thick PET film (SP-PET-03-B made by Tohcello Co. Ltd.) at a post-drying thickness of 4 mm, and then dried into the fourth multilayer structure.

| | |
|---|---|
| Polyester resin (Vylonal MD1985 made by Toyobo Ltd. and having a melting point of 110° C., a Tg of −20° C. and a number-average molecular weight of 25,248) | 75 parts by mass |
| Silica fine particles ("Silysia 420 made by Fuji Silysia Co., Ltd. and having a particle diameter of 4.1 μm | 12 parts by mass |
| Solvent (water/isopropyl alcohol = 1/1 by mass) | 50 parts by mass |

With laser light of 532 nm in wavelength, a Lippmann hologram was taken and recorded in the first multilayer structure obtained in Example 1. After recording, the multilayer structure was heated for 10 minutes in an atmosphere of 100° C., and the surface releasing PET film was peeled off to bare out the volume hologram layer.

The above fourth multilayer structure was placed on the heat seal layer side over the exposed surface of the volume hologram layer, and then passed between a pair of nipped, heated rollers of 80° C. into a multilayer structure of PET film/first heat seal layer volume hologram layer/PET film, which was then irradiated all over the surface with ultraviolet radiation at a dose of 2,500 mJ/cm², using a high-pressure mercury lamp, whereby the volume hologram was fixed in place.

Coating of the Second Heat Seal Layer

Then, the PET film was peeled off the multilayer structure of PET film/first heat seal layer/volume hologram layer/PET film to bare out the volume hologram layer, and the following composition was coated on the exposed surface of that volume hologram layer at a post-drying thickness of 4 mm by means of gravure coating to form the second heat seal layer by coating. In this way, the second volume hologram transfer foil of the invention was obtained.

| | |
|---|---|
| Polyester resin (Vylonal MD1985 made by Toyobo Ltd. and having a melting point of 110° C., a Tg of −20° C. and a number-average molecular weight of 25,248) | 75 parts by mass |
| Silica fine particles ("Silysia 420 made by Fuji Silysia Co., Ltd. and having a particle diameter of 4.1 μm | 12 parts by mass |
| Solvent (water/isopropyl alcohol = 1/1 by mass) | 50 parts by mass |

The obtained second volume hologram transfer foil of the invention was thermo-compressed on the second heat seal layer side onto a polyvinyl chloride card as the application member 6 under conditions of 140° C., 0.5 sec. and 0.7 MPa for thermal transfer of the volume hologram layer. After the thermal transfer, the substrate was peeled off, and a 25 μm-thick PET film (Lumilar T60 made by Toray Industries Inc.) was thermo-compressed on the surface where the substrate was under conditions of 140° C., 0.5 sec. and 0.7 Mpa, followed by lamination of the application member 6', thereby obtaining the second volume hologram transfer foil of the invention.

Each volume hologram layer was found to be well thermally transferred onto the application member. After transfer, Cellotape® (made by Nichiban Co., Ltd.) was applied to the application member from above, and stripped off by brutal force to estimate adhesion to the application member 6. As a result, the volume hologram layer was found to remain on the application member 6; even when the polyester resin card was used as the application member 6, there was good adhesion obtained as was the case with the polyvinyl chloride card, ensuring good counterfeit resistance.

Example 9

First Multilayer Structure Having a Volume Hologram-forming Material Layer

A volume hologram-forming material composed of 40 parts of the composition, mentioned just below, and 60 parts by mass of a mixed solvent consisting of methyl ethyl ketone/methanol=1/1 (by mass) was coated on a 50 μm-thick PET film (Lumilar T60 made by Toray Industries Inc.) at a dry thickness of 20 μm by means of gravure coating.

| | |
|---|---|
| Binder resin {methyl methacrylate/glycidyl methacrylate copolymer having a copolymerization ratio (by mass) of 90/10 and a weight-average molecular weight of 50,000}: | 30 parts by mass |
| Bis(4-acryloxydiethoxyphenyl)methane: | 30 parts by mass |
| 1,6-hexanediol diglycidyl ether: | 30 parts by mass |
| Photoradical polymerization initiator (also acting as photocation polymerization initiator) (diphenyliodonium hexafluoroantimonate) | 4 parts by mass |
| Sensitizer (3,9-diethyl-3'-carboxymethyl-2,2'-thiacarbocyanine iodine salt): | 1 part by mass |
| Fine particles (Fluon L170J made by Asahi Glass Co., Ltd. and having an average particle diameter of 200 nm): | 5 parts by mass |

Then, a 50 μm-thick releasing PET film (SP-PET made by Tohcello Co., Ltd.) was laminated on the thus coated surface to obtain a first multilayer structure.

Second Multilayer Structure Having a Protective Layer

The following composition working as a protective layer was coated on a 50 μm-thick PET film (Lumilar T60 made by Toray Industries Inc.) by means of a gravure coater to obtain a multilayer structure having a protective layer having a dry thickness of 1 μm.

| | |
|---|---|
| Polymethyl methacrylate (having a molecular weight of 35,000) | 97 parts by mass |
| Polyethylene wax (having a molecular weight of 10,000) | 3 parts by mass |
| Solvent (methyl ethyl ketone/toluene = 1/1 by mass) | 400 parts by mass |

Volume Hologram Recording

With laser light of 532 nm in wavelength, a Lippmann hologram was taken and recorded in the above first multilayer structure. After recording, the multilayer structure was heated for 10 minutes in an atmosphere of 100° C., and the surface releasing PET film was peeled off to bare out the volume hologram layer.

The above second multilayer structure was placed on the protective layer side over the exposed surface of the volume hologram layer, and then passed between a pair of nipped, heated rollers of 80° C. into a multilayer structure of PET film/volume hologram layer/protective layer/PET film, which was then irradiated all over the surface with ultraviolet radiation at a dose of 2,500 J/cm², using a high-pressure mercury lamp, so that the volume hologram was fixed in place.

Coating of the Primer Layer

The PET film was peeled off the multilayer structure of PET film/volume hologram layer/protective layer/PET film with the volume hologram fixed in place to bare out the volume hologram layer, and the material composed of the following composition was coated on the surface of that volume hologram layer at a dry thickness of 1 μm by means of gravure coating to form the primer layer.

| | |
|---|---|
| Water dispersion type polyurethane resin (Takelac W2501 made by Mitsui Takeda Chemicals, Inc.) | 100 parts by mass |
| Polyisocyanate curing agent (Takenate WD-730 made by Mitusi Takeda Chemicals, Inc.) | 5 parts by mass |
| Ion exchanged water | 50 parts by mass |

Coating of the Heat Seal Layer

The following composition was coated on the surface of the primer layer in the multilayer structure of primer layer/volume hologram layer/protective layer/PET film at a post-drying thickness of 3 μm by means of gravure coating to obtain the inventive volume transfer foil.

| | |
|---|---|
| Polyester resin (Vylon 550 made by Toyobo Ltd. and having a Tg of −15° C. and a number-average molecular weight of 48,284) | 30 parts by mass |
| Solvent (methyl ethyl ketone/toluene = 1/1 by mass) | 70 parts by mass |

Example 10

The inventive volume hologram transfer foil was obtained as in Example 9 with the exception that the material composed of the following composition was used for the coating of the primer layer.

| | |
|---|---|
| Water dispersion type polyurethane resin (Evafanol HO-30C made by Nicca Chemical Co., Ltd.) | 100 parts by mass |
| Polyisocyanate curing agent (NK Assist IS-100N made by Nicca Chemical Co., Ltd.) | 7 parts by mass |
| Ion exchanged water | 50 parts by mass |

Example 11

The inventive volume hologram transfer foil was obtained as in Example 9 with the exception that the material composed of the following composition was used for the coating of the heat seal layer.

| | |
|---|---|
| Polyester resin (Vylon UR8700 made by Toyobo Ltd. and having a Tg of −22° C. and a number-average molecular weight of 29,208) | 30 parts by mass |
| Solvent (methyl ethyl ketone/toluene = 1/1 by mass) | 70 parts by mass |

Example 12

The inventive volume hologram transfer foil was obtained as in Example 9 with the exception that the material composed of the following composition was used for the coating of the heat seal layer.

| | |
|---|---|
| Polyester resin (Vylonal MD1930 made by Toyobo Ltd. and having a melting point of 110° C., a Tg of −10° C. and a number-average molecular weight of 18,826) | 50 parts by mass |
| Solvent (water/isopropyl alcohol = 1/1 by mass) | 50 parts by mass |

Example 13

The inventive volume hologram transfer foil was obtained as in Example 9 with the exception that the material composed of the following composition was used for the coating of the heat seal layer.

| | |
|---|---|
| Polyester resin (Vylonal MD1985 made by Toyobo Ltd. and having a melting point of 110° C., a Tg of −20° C. and a number-average molecular weight of 25,248) | 75 parts by mass |
| Silica fine particles (Silysia 420 made by Fuji Silysia Chemical Co., Ltd. and having a particle diameter of 4.1 μm | 12 parts by mass |
| Solvent (water/isopropyl alcohol = 1/1 by mass) | 250 parts by mass |

Example 14

Third Multilayer Structure of Primer Layer/Heat Seal Layer/Releasing Film

The composition having the following composition was coated on the releasing surface of a 50 μm-thick releasing PET film (SP-PET made by Tohcello Co., Ltd.) such that a heat seal layer of 4 μm in post-drying thickness and a primer layer of 1 μm in post-drying thickness were sequentially formed, thereby obtaining the third multilayer structure.

Composition of the Heat Seal Layer

| | |
|---|---|
| Polyester resin (Vylon 550 made by Toyobo Ltd. and having a Tg of −15° C. and a number-average molecular weight of 48,284) | 20 parts by mass |
| Solvent (methyl ethyl ketone/toluene = 1/1 by mass) | 80 parts by mass |
| Water dispersion type polyurethane resin (Takelac made by Mitsui Takeda Chemicals, Inc.) | 100 parts by mass |
| Polyisocyanate curing agent (Takenate WD-730 made by Mitsui Takeda Chemicals Co., Ltd.) | 5 parts by mass |
| Ion exchanged water | 50 parts by mass |

The PET film was peeled off the multilayer structure of PET film/volume hologram layer/protective layer/PET film with the volume hologram fixed, obtained in Example 9, to bare out the volume hologram layer. Then, the third multilayer structure was laminated on the primer layer side over the surface of that volume hologram layer, and passed between a pair of nipped, heated roller of 120° C. to obtain the inventive hologram transfer foil having a multilayer construction of releasing PET film/heat seal layer/primer layer/volume hologram layer/protective layer/PET film.

Comparative Example 4

A comparative volume hologram transfer foil was obtained as in Example 9 with the exception that the material composed of the following composition was used for the coating of the primer layer.

| | |
|---|---|
| Polyester resin (TP-219 made by Nippon Synthetic Chemicals Industry Co., Ltd. and having a Tg of 40° C. and a number-average molecular weight of 3,000) | 20 parts by mass |
| Solvent (methyl ethyl ketone/toluene = 1/1 by mass) | 80 parts by mass |

Comparative Example 5

A comparative volume hologram transfer foil was obtained as in Comparative Example 4 with the exception that the material composed of the following composition was used for the coating of the heat seal layer.

| | |
|---|---|
| Acrylic resin (TS-413A made by Dainippon Ink and Chemicals Industry Inc. | 30 parts by mass |
| Solvent (methyl ethyl ketone/toluene = 1/1 by mass) | 70 parts by mass |

Comparative Example 6

A comparative volume hologram transfer foil was obtained as in Example 9 with the exception that the material composed of the following composition was used for the coating of the primer layer.

| | |
|---|---|
| Polyvinyl butyral resin (S-LEC BL-1 made by Sekisui Chemical Co., Ltd.) | 20 parts by mass |
| Solvent (methyl ethyl ketone/toluene = 1/1 by mass) | 80 parts by mass |

Comparative Example 7

A comparative volume hologram transfer foil was obtained as in Example 9 with the exception that the material composed of the following composition was used for the coating of the primer layer.

| | |
|---|---|
| Organic solvent type polyurethane resin (Takelac E-551T made by Mitsui Takeda Chemicals, Inc.) | 100 parts by mass |
| Polyisocyanate curing agent (Takenate D-140N made by Mitsui Takeda Chemicals Inc.) | 30 parts by mass |
| Solvent (methyl ethyl ketone/toluene = 1/1 by mass) | 100 parts by mass |

The volume hologram transfer foils obtained in Examples 9-14 and Comparative Examples 4-7 were each thermally compressed under conditions of 140° C., 0.5 sec. and 0.7 Mpa onto application members, a polyvinyl chloride card, a polyester resin card (PET-G card) and coated paper (Swing Mat made by Mitsubishi Paper Mills, Ltd., 64.0 g/m²) for thermocompression transfer of the volume hologram layer to the application member. Note here that the volume hologram transfer foil of Example 14 was thermally transferred onto the application member after the releasing film was peeled off it.

Estimation of Thermal Transfer Capability

Just after lamination (after about 2 seconds), the substrate was peeled off between the volume hologram layer and the protective layer to determine the transfer capability of the volume hologram layer, with the results shown in Table 1. In Table 1, "good" indicates that there is smooth transfer onto the application member, and "bad" does that there is no thermal transfer.

Estimation of Adhesion to the Application Member After Transfer

After the transfer, Cellotape® (made by Nichiban Co., Ltd.) was applied onto each protective layer from above, and stripped off by brutal force to measure adhesion between the application member and the volume hologram layer, with the results again shown in Table 1. In Table 1, "fairly good" indicates that in all of five tape adhesion tests, the volume hologram layer remains sticking to the application member, "good" indicates that in three of the five tape adhesion tests, the volume hologram layer remains sticking to the application member, and "bad" indicates that in all of the tests, the volume hologram layer passes on the tape side. Note here that (–) indicates that there was no transfer of the volume hologram layer onto the application member, unable to make estimation of adhesion to the application member.

TABLE 1

| | Transfer capability | | | Adhesion to application member | | |
|---|---|---|---|---|---|---|
| | (A) | (B) | (C) | (A) | (B) | (C) |
| Ex. 9 | good | good | good | good | good | good |
| Ex. 10 | good | good | good | good | good | good |
| Ex. 11 | good | good | good | good | good | good |
| Ex. 12 | good | good | good | fairly good | fairly good | fairly good |
| Ex. 13 | good | good | good | fairly good | fairly good | fairly good |
| Ex. 14 | good | good | good | good | good | good |
| CE 4 | bad | bad | bad | — | — | — |
| CE 5 | bad | bad | bad | — | — | — |
| CE 6 | good | good | good | good | bad | bad |
| CE 7 | good | good | good | good | bad | bad |

CE: comparative example
(A): polyvinyl chloride card
(B): polyester card
(C): coated paper The use of the volume hologram transfer foils of Examples 9-14 improves both transfer capability and adhesion to the application member, and from the comparative examples it is found that there is no tradeoff between transfer capability and adhesion to the application member.

What is claimed is:

1. A volume hologram transfer foil, comprising a substrate and a protective layer, a volume hologram layer and a heat seal layer stacked on the substrate in this order wherein a multilayer structure comprising the protective layer, the volume hologram and the heat seal layer in this order is releasable from said substrate, characterized in that said heat seal layer is formed using an aqueous dispersion of a polyester resin having a glass transition temperature of –10° C. to –30° C. and a melting point of 80° C. to 200° C., and including a hydrophilic functional group.

2. The volume hologram transfer foil according to claim 1, characterized in that the polyester resin has a number-average molecular weight of 18,000 to 80,000.

3. The volume hologram transfer foil according to claim 1, characterized in that the heat seal layer contains a fine particle.

4. The volume hologram transfer foil according to claim 1, characterized in that there is a releasing film additionally provided on the heat seal layer.

5. The volume hologram transfer foil according to claim 1, characterized in that the volume hologram layer comprises a cation-polymerizable compound, a radical-polymerizable compound, a photoradical polymerization initiator system that is sensitive to specific wavelength light to polymerize the radical-polymerizable compound, and a photocation polymerization initiator system that is less sensitive to said specific wavelength light but is sensitive to another wavelength light to polymerize the cation-polymerizable compound.

6. The volume hologram transfer foil according to claim 1, characterized in that there is a primer layer interposed between the volume hologram layer and the heat seal layer.

7. A Volume hologram transfer foil, comprising a substrate and a first heat seal layer, a volume hologram layer and a second heat seal layer stacked on said substrate in this order wherein a multilayer structure comprising the first heat seal layer, the volume hologram layer and the second heat seal layer in this order is releasable from said substrate, characterized in that the first and the second heat seal layer are each formed using an aqueous dispersion of a polyester resin having a glass transition temperature of $-10°$ C. to $-30°$ C. and a melting point of $80°$ C. to $200°$ C., and including a hydrophilic functional group.

8. The volume hologram transfer foil according to claim 7, characterized in that the polyester resin has a number-average molecular weight of 18,000 to 80,000.

9. The volume hologram transfer foil according to claim 7, characterized in that the first and the second heat seal layer each contains a fine particle.

10. The volume hologram transfer foil according to claim 7, characterized in that there is a releasing film additionally provided on the second heat seal layer.

11. The volume hologram transfer foil according to claim 7, characterized in that the volume hologram layer comprises a cation-polymerizable compound, a radical-polymerizable compound, a photoradical polymerization initiator system that is sensitive to specific wavelength light to polymerize the radical-polymerizable compound, and a photocation polymerization initiator system that is less sensitive to said specific wavelength light but is sensitive to another wavelength light to polymerize the cation-polymerizable compound.

12. The volume hologram transfer foil according to claim 7, characterized in that there is a primer layer interposed between the volume hologram layer and the first and/the second heat seal layer.

13. A volume hologram multilayer structure, comprising a heat seal layer, a volume hologram layer and a protective layer stacked on an application member in this order, characterized in that the heat seal layer is formed using an aqueous dispersion of a polyester resin having a glass transition temperature of $-10°$ C. to $-30°$ C. and a melting point of $80°$ C. to $200°$ C. and including a hydrophilic functional group.

14. The volume hologram multilayer according to claim 13, characterized in that the application member is a polyester resin card or a polyester film.

15. The volume hologram multilayer structure according to claim 13, characterized in that there is a primer layer interposed between the volume hologram layer and the heat seal layer.

16. A volume hologram multilayer structure, comprising a first application member and a first heat seal layer, a volume hologram layer, a second heat seal layer and a second application member stacked on the first application member in this order, characterized in that the first and the second heat seal layer are each formed using an aqueous dispersion of a polyester resin having a glass transition temperature of $-10°$ C. to $-30°$ C. and a melting point of $80°$ C. to $200°$ C. and including a hydrophilic functional group.

17. The volume hologram multilayer structure according to claim 16, characterized in that the first and the second application member each is a polyester resin card or a polyester film.

18. The volume hologram multilayer structure according to claim 16, characterized in that there is a primer layer interposed between the volume hologram layer and the first and/or the second heat seal layer.

* * * * *